US012537210B2

United States Patent
Fukaya et al.

(10) Patent No.: US 12,537,210 B2
(45) Date of Patent: Jan. 27, 2026

(54) FUEL CELL CONTROL COMMAND DEVICE

(71) Applicant: KABUSHIKI KAISHA TOYOTA CHUO KENKYUSHO, Nagakute (JP)

(72) Inventors: Norihiro Fukaya, Nagakute (JP); Takao Watanabe, Nagakute (JP); Ryoichi Hibino, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 530 days.

(21) Appl. No.: 18/030,601

(22) PCT Filed: Sep. 21, 2021

(86) PCT No.: PCT/JP2021/034517
§ 371 (c)(1),
(2) Date: Apr. 6, 2023

(87) PCT Pub. No.: WO2022/130721
PCT Pub. Date: Jun. 23, 2022

(65) Prior Publication Data
US 2023/0369618 A1   Nov. 16, 2023

(30) Foreign Application Priority Data
Dec. 16, 2020  (JP) .................................. 2020-208243

(51) Int. Cl.
*H01M 8/04858* (2016.01)
*H01M 8/0432* (2016.01)
(Continued)

(52) U.S. Cl.
CPC ..... *H01M 8/0494* (2013.01); *H01M 8/04365* (2013.01); *H01M 8/04492* (2013.01);
(Continued)

(58) Field of Classification Search
CPC ........... H01M 8/0494; H01M 8/04365; H01M 8/04492; H01M 8/04559
See application file for complete search history.

(56) References Cited

U.S. PATENT DOCUMENTS

2007/0248848 A1   10/2007  Marsh
2010/0068576 A1    3/2010  Hamada et al.

FOREIGN PATENT DOCUMENTS

EP        3920290 A1    12/2021
JP     2010-021072 A     1/2010
(Continued)

OTHER PUBLICATIONS

Feb. 7, 2025 extended Search Report issued in European Patent Application No. 21826072.7.
(Continued)

*Primary Examiner* — Olatunji A Godo
(74) *Attorney, Agent, or Firm* — Oliff PLC

(57) ABSTRACT

A fuel cell control command device including: a catalyst potential calculation unit for calculating a catalyst potential of a cathode catalyst; a coating state calculation unit for calculating an oxide film formation amount of the catalyst; a command value candidate calculation unit for calculating a plurality of command value candidates including a combination of an estimated current, estimated total voltage, and a candidate control parameter, from which a power command value is obtained; a loss amount calculation unit for calculating an estimated loss for each combination; a provisional catalyst potential calculation unit for calculating an estimated catalyst potential for each combination; a deterioration amount calculation unit for calculating an estimated deterioration amount for each combination; and a command value calculation unit for selecting a combination having a minimum comprehensive index including the estimated loss
(Continued)

and/or the estimated deterioration amount and outputting the selected combination as a command value.

13 Claims, 6 Drawing Sheets

(51) Int. Cl.
  *H01M 8/04492* (2016.01)
  *H01M 8/04537* (2016.01)
  *H01M 8/04664* (2016.01)

(52) U.S. Cl.
  CPC ... *H01M 8/04559* (2013.01); *H01M 8/04619* (2013.01); *H01M 8/04679* (2013.01); *H01M 8/0488* (2013.01); *H01M 8/0491* (2013.01)

(56) References Cited

FOREIGN PATENT DOCUMENTS

| JP | 2010-067434 A | 3/2010 |
|---|---|---|
| JP | 2011-192458 A | 9/2011 |
| JP | 2012-129069 A | 7/2012 |
| JP | 2013-101774 A | 5/2013 |
| JP | 2017-084451 A | 5/2017 |
| WO | 2020155018 A1 | 8/2020 |

OTHER PUBLICATIONS

Darling, Robert M. et al., "Kinetic Model of Platinum Dissolution in PEMFCs", Journal of The Electrochemical Society, vol. 150, No. 11, 2003.
Jul. 27, 2021 International Search Report issued in International Patent Application No. PCT/JP2021/017155.
Jul. 27, 2021 Writtten Opinion issued in International Patent Application No. PCT/JP2021/017155.
Sep. 20, 2022 Office Action issued in Japanese Patent Application No. 2020-208243.
Oct. 26, 2021 International Search Report issued in International Patent Application No. PCT/JP2021/034517.
Oct. 26, 2021 Written Opinion of the International Searching Authority issued in International Patent Application No. PCT/JP2021/034517.
U.S. Appl. No. 17/916,891, filed Oct. 4, 2022 in the name of Ryoichi Hibino et al.
Sep. 18, 2025 U.S. Office Action issued in U.S. Appl. No. 17/916,891.
Cha, S (2016). Fuel cell Fundamentals. (3rd ed.) (pp. 272-294, 346, 431-449). (Year: 2016).

FUEL CELL CONTROL COMMAND DEVICE

FIELD OF THE INVENTION

The present invention relates to a fuel cell control command device, and more specifically to a fuel cell control command device capable of controlling a fuel cell so that when there is an output request to the fuel cell, power as required is output, power generation efficiency becomes relatively high, and a deterioration of a cathode catalyst is suppressed to a minimum.

BACKGROUND OF THE INVENTION

A polymer electrolyte fuel cell includes a membrane electrode assembly (MEA) in which a catalyst layer containing a catalyst is bonded to both surfaces of an electrolyte membrane. The catalyst layer is a portion serving as a reaction field of an electrode reaction, and generally includes a composite of carbon supporting an electrode catalyst such as platinum and a solid polymer electrolyte (a catalyst layer ionomer).

In the polymer electrolyte fuel cell, a gas diffusion layer is usually disposed outside the catalyst layer. Further, a current collector (separator) including a gas flow path is disposed outside the gas diffusion layer. A polymer electrolyte fuel cell usually has a structure (a fuel cell stack) in which a plurality of unit cells each including such MEA, the gas diffusion layer, and the current collector are stacked.

In a case where the polymer electrolyte fuel cell is used as an in-vehicle power source, a voltage of the polymer electrolyte fuel cell greatly fluctuates according to traveling situations of a vehicle. When the polymer electrolyte fuel cell is in a low load state, power generation efficiency is increased, but the cathode catalyst is exposed to a high potential state, so that catalyst components are easily eluted from the cathode catalyst. On the other hand, when the polymer electrolyte fuel cell is in a high load state, although the power generation efficiency decreases, the cathode catalyst is exposed to a low potential state, and thus the eluted catalyst components are likely to be reprecipitated on a surface of the cathode catalyst. Therefore, when the cathode catalyst is repeatedly exposed to the high potential state and the low potential state, there is a problem that the cathode catalyst is gradually deteriorated.

Thereupon, in order to solve this problem, various proposals have been conventionally made.

For example, Patent Literature 1 discloses a method for controlling a fuel cell system, the method including:
(a) obtaining in advance a correspondence relationship among the number of fluctuations of an output voltage of a fuel cell, an upper limit value of the output voltage of the fuel cell, and a deterioration state of an electrode catalyst layer; and
(b) determining the upper limit value of the output voltage so that the upper limit value of the output voltage is reduced as the number of fluctuations of the output voltage per unit time is increased.

Patent Literature 1 describes that elution and deterioration of platinum or a platinum alloy contained in the electrode catalyst layer can be suppressed by such a method.

Patent Literature 2 discloses a method for controlling a fuel cell system, without intention of suppressing a deterioration of a cathode catalyst, the method including:
(a) deriving a catalyst oxide film ratio based on a difference between a generation reaction rate when an oxide film is formed on a surface of a cathode catalyst and a reduction reaction rate when the oxide film is reduced;
(b) correcting current-voltage characteristics of a fuel cell based on the catalyst oxide film ratio; and
(c) setting an output current and an output voltage for obtaining power corresponding to a load request using the corrected current-voltage characteristics when the load request is made to the fuel cell.

Patent Literature 2 describes that:
(A) when the oxide film is formed on the surface of cathode catalyst, a progress of an electrochemical reaction on the surface of the cathode catalyst is suppressed, so that the current-voltage characteristics change;
(B) when power generation control is performed based on the current-voltage characteristics acquired in advance (the current-voltage characteristics in a state where there is no oxide film) even though the current-voltage characteristics are changed by formation of oxide film, an accuracy of power generation control decreases; and
(C) when the catalyst oxide film ratio is sequentially calculated and the current-voltage characteristics are corrected according to the catalyst oxide film ratio, it is possible to suppress a decrease in accuracy of the power generation control due to the formation of the oxide film.

When the method described in Patent Literature 1 is used, deterioration of the cathode catalyst due to a voltage fluctuation can be suppressed to some extent. However, in the method described in the Literature, an upper limit potential is uniformly controlled without considering presence or absence of the oxide film. Therefore, in the method of the Literature, there is a possibility that the power generation efficiency is lowered, and there is a possibility that an excess or deficiency occurs with respect to the required power. Further, when the fuel cell is used in an environment where a potential fluctuation occurs, the voltage of the fuel cell does not necessarily reach the upper limit potential. Therefore, when the potential fluctuation occurs within a range not reaching the upper limit potential, the deterioration cannot be suppressed.

On the other hand, when the method described in Patent Literature 2 is used, it is possible to suppress a decrease in accuracy of the power generation control due to the formation of the oxide film on the surface of the cathode catalyst. However, Patent Literature 2 neither describes nor suggests a method for suppressing the deterioration of the cathode catalyst.

CITATION LIST

Patent Literature

Patent Literature 1: JP 2012-129069 A
Patent Literature 2: JP 2011-192458 A

SUMMARY OF THE INVENTION

An object of the present invention is to provide a fuel cell control command device capable of controlling a fuel cell so that when there is an output request to the fuel cell, a power as required is output, power generation efficiency becomes relatively high, and deterioration of a cathode catalyst is suppressed to a minimum.

In order to solve the problem above, a fuel cell control command device according to the present invention has the following configuration.

(1) A catalyst potential calculation unit configured to calculate a catalyst potential Vcat(i) of a cathode catalyst of a fuel cell based on at least a total voltage V(i) at a time i of the fuel cell.

(2) A coating state calculation unit configured to calculate an oxide film formation amount θ(i) of the cathode catalyst at the time i based on at least the Vcat(i).

(3) A command value candidate calculation unit configured to calculate, based on a power command value Pfc_cm(i) to the fuel cell at the time i, a plurality of command value candidates including a combination of an estimated current value I_op(i,X_op) and an estimated total voltage value V_op(i,X_op) from which the Pfc_cm(i) is obtained, and a candidate control parameter value X_op(i,Pfc_cm) for realizing the I(i,X_op) and the V_op(i,X_op).

(4) A loss amount calculation unit configured to calculate an estimated value of loss Ploss_op(i,X_op) of the fuel cell for each of the plurality of command value candidates.

(5) A provisional catalyst potential calculation unit configured to calculate an estimated value of a catalyst potential Vcat_op(i,X_op) of the cathode catalyst for each of the plurality of command value candidates.

(6) A deterioration amount calculation unit configured to calculate an estimated value of a deterioration amount M_op(i,X_op) of the fuel cell for each of the plurality of command value candidates.

(7) A command value calculation unit configured to calculate a comprehensive index Y_op(i,X_op) including the Ploss_op(i,X_op) and/or the M_op(i,X_op) for each of the plurality of command value candidates, and select a combination of the X_op(i,Pfc_cm), the V_op(i, X_op), and the I_op(i,X_op) with the smallest Y_op(i, X_op) from the plurality of command value candidates and output the selected combination as a command value X_cm(i) of a control parameter, a command value V_cm(i) of a total voltage, and a command value I_cm(i) of a current.

A relationship of Pfc=VI holds among a power Pfc, a total voltage V, and a current I. In other words, there is a plurality of combinations of the current I and the total voltage V for obtaining a predetermined power Pfc.

On the other hand, the current-voltage characteristics of the fuel cell change according to control parameters X (a cathode gas flow rate Q, a cathode gas pressure Pair, a temperature Tfc of the fuel cell, a humidity RH of the fuel cell, and the like). In other words, by changing the control parameters X, the combination of the current I and the total voltage V can be changed in a relatively wide range while maintaining the power Pfc constant.

Therefore, when an oxide film formation amount θ of the cathode catalyst is small, by controlling the control parameters X to make the catalyst potential Vcat become small, the power generation can be performed under the low potential condition with less deterioration of the cathode catalyst while maintaining the power P at a required value Pfc.

On the other hand, when the oxide film formation amount θ is large, by controlling the control parameters X to make the catalyst potential Vcat become large, the power generation can be performed under the high potential condition with high efficiency while maintaining the power P at the required value Pfc.

DETAILED DESCRIPTION OF PREFERRED EMBODIMENTS

Hereinafter, one embodiment of the present invention will be described in detail.

1. Parameters

Table 1 shows a list of parameters used in the present invention.

The subscript "cm" represents "command", that is, a command value of each variable for a fuel cell. The subscript "op" represents "option", that is, a candidate value or an estimated value from which each variable can be selected.

"i" represents a discrete time. A time interval for acquiring each variable is not particularly limited, and an optimal time interval can be selected according to purposes. The optimal time interval depends on an application of a fuel cell system. For example, when the fuel cell system is used as an in-vehicle power source, the time interval is usually 1 ms to 100 ms.

"V(i)" represents a measured value of a total voltage at the time i in a case where the total voltage V of the fuel cell is measured at predetermined time intervals. The same applies to "I(i)", "R(i)", and the like.

"V_op(i,X_op)" represents an estimated total voltage value V_op at the time i and indicates that V_op is a function of control parameters X_op. The same applies to "X_op(i, Pfc_cm)", "I_op(i,X_op)", and the like.

TABLE 1

| Discrete time | i |
|---|---|
| Total voltage of FC (measured value) | V(i) |
| Current of FC (measured value) | I(i) |
| Direct-current resistance R of FC (measured value) | R(i) |
| Temperature of FC (measured value) | Tfc(i) |
| Humidity of FC (measured value) | RH(i) |
| Catalyst potential of cathode catalyst | Vcat(i) |
| Oxide film formation amount on catalyst surface (0 to 1) | θ(i) |
| Candidate control parameter value for Pfc | X_op(i, Pfc_cm) |
| Candidate value of cathode gas flow rate | Q_op(i) |
| Candidate value of cathode gas pressure | Pair_op(i) |
| Candidate value of temperature of FC | Tfc_op(i) |
| Candidate value of humidity of FC | RH_op(i) |
| Estimated value of FC total voltage for each value of X_op | V_op(i, X_op) |
| Estimated value of FC current for each value of X_op | I_op(i, X_op) |
| Estimated value of cathode catalyst potential for each value of X_op | Vcat_op(i, X_op) |
| Estimated value of loss for each value of X_op | Ploss_op(i, X_op) |
| Estimated value of FC deterioration amount for each value of X_op | M_op(i, X_op) |
| Comprehensive Index | Y_op(i, X_op) |
| Power command value for FC | Pfc_cm(i) |
| Command value of control parameter for FC | X_cm(i) |
| Command value of FC voltage | V_cm(i) |
| Command value of FC current | I_cm(i) |

2. Application Target

The fuel cell control command device according to the present invention can be applied to various fuel cells. Examples of the fuel cell to which the present invention can be applied include a polymer electrolyte fuel cell, an alkaline electrolyte fuel cell, a phosphoric acid fuel cell, a molten carbonate fuel cell, and a solid oxide fuel cell.

3. Fuel Cell Control Command Device (1)

Figure 1:
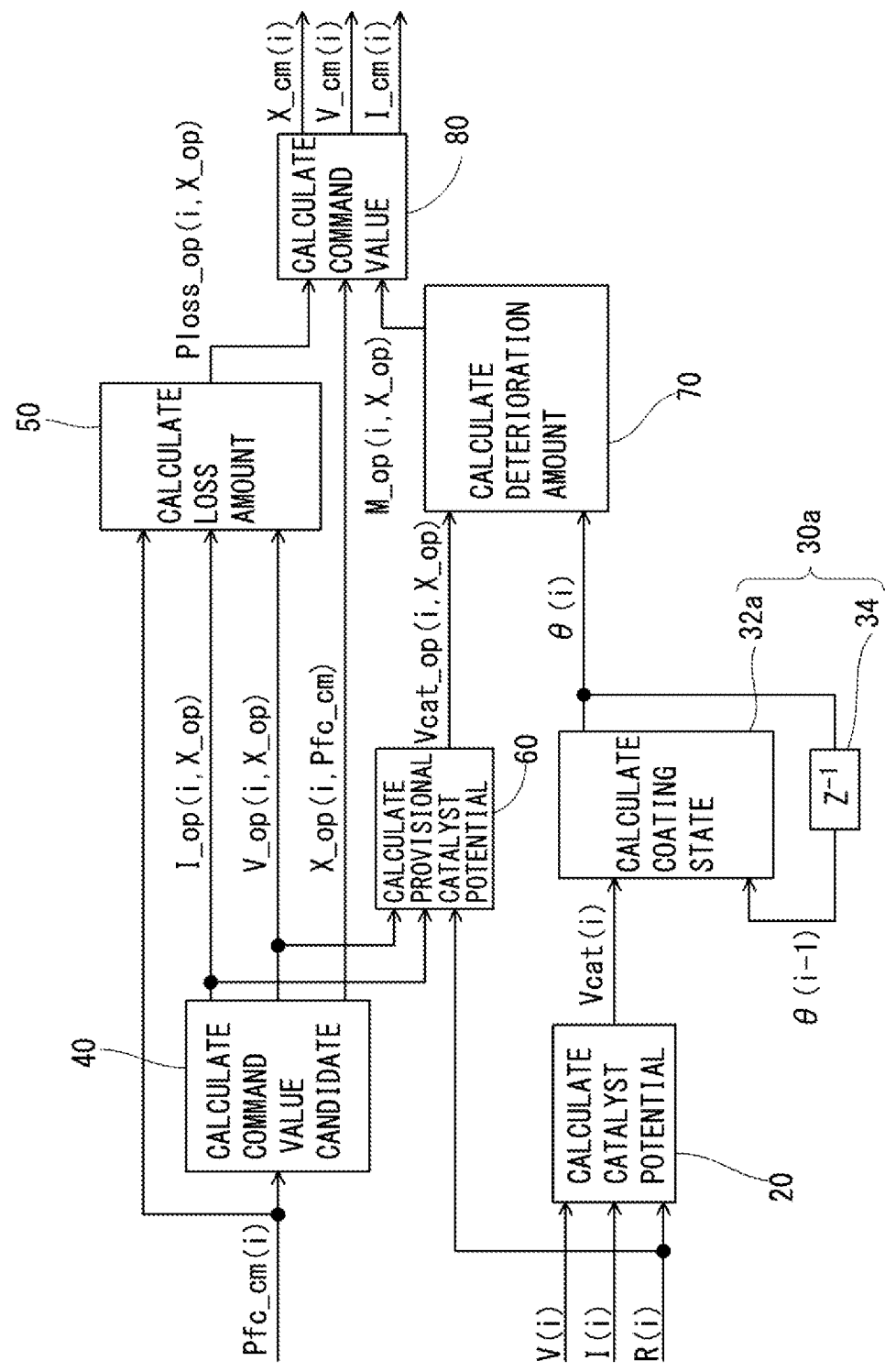
FIG. 1 is a block diagram of a fuel cell control command device according to a first embodiment of the present invention.

FIG. 1 illustrates the block diagram of the fuel cell control command device according to the first embodiment of the present invention. In FIG. 1, a fuel cell control command device 10a includes a catalyst potential calculation unit 20, a coating state calculation unit 30a, a command value candidate calculation unit 40, a loss amount calculation unit 50, a provisional catalyst potential calculation unit 60, a deterioration amount calculation unit 70, and a command value calculation unit 80.

[3.1. Catalyst Potential Calculation Unit]

The catalyst potential calculation unit 20 is a means for calculating a catalyst potential Vcat(i) of the cathode catalyst of the fuel cell based on at least the total voltage V(i) at the time i of the fuel cell.

The catalyst potential calculation unit 20 may calculate Vcat(i) based only on V(i), or may calculate Vcat(i) based on the total voltage V(i), a current I(i), and a high-frequency direct-current resistance R(i).

The fuel cell usually has a structure in which a plurality of unit cells each including an MEA (including one having gas diffusion layers disposed at both ends thereof) and a separator are stacked (a stack structure).

The "total voltage V" of the fuel cell refers to a potential difference across the stack.

Strictly speaking, the "catalyst potential Vcat of the cathode catalyst" refers to a value obtained by adding a potential drop caused by an internal resistance to the potential of the cathode of each unit cell.

When the fuel cell is operated, normally, V(i) and I(i) are sequentially measured. R(i) can be measured by superimposing a high frequency on a current or a voltage during operation of the fuel cell. Alternatively, R(i) may be measured in advance for each operating condition and mapped. Vcat(i) can be calculated using these parameters.

In the present invention, a calculation method of Vcat(i) is not particularly limited, and an optimal method can be selected according to purposes. In particular, the catalyst potential calculation unit 20 preferably calculates Vcat(i) based on the following Formula (1) or Formula (2).

[Math. 1]

$$V cat(i) = \frac{V(i)}{N \text{cell}} + \frac{I(i)}{A \text{cell}} \times \frac{R(i) \times A \text{cell}}{N \text{cell}} \quad (1)$$

$$V cat(i) = \frac{V(i)}{N \text{cell}} \quad (2)$$

where
Ncell is the number of unit cells of the fuel cell, and
Acell is an area of the unit cell.

Vcat(i) is strictly expressed by Formula (1). In Formula (1), a first term represents the potential difference (a cell voltage) between both ends of the unit cell. A second term represents the potential drop per unit cell caused by the internal resistance. Using Formula (1), Vcat(i) can be accurately calculated.

Formula (2) is an approximate formula of Vcat(i) in which the potential drop caused by the internal resistance is ignored. Formula (2) is inferior in calculation accuracy to Formula (1). However, using Formula (2) can simplify the calculation of Vcat(i). Further, since Vcat(i) is estimated to be lower than an actual value when Formula (2) is used, there is a possibility that the power generation efficiency of the fuel cell is improved as compared with a case of using Formula (1), but there is a possibility that catalyst deterioration is accelerated.

[3.2 Coating State Calculation Unit]

The coating state calculation unit 30a is a means for calculating the oxide film formation amount θ(i) of the cathode catalyst at the time i based on at least Vcat(i).

The coating state calculation unit 30a may calculate θ(i) based only on Vcat(i), or may calculate θ(i) based on Vcat(i) and an oxide film formation amount θ(i−1) of the cathode catalyst at a time (i−1). Furthermore, the coating state calculation unit may calculate θ(i) in consideration of other parameters, in addition to Vcat(i) and θ(i−1).

In the example illustrated in FIG. 1, the coating state calculation unit 30a includes:
- a main circuit 32a for calculating the oxide film formation amount θ(i) (hereinafter, also referred to as "present value θ(i)") at the time i from Vcat(i) and the oxide film formation amount θ(i−1) (hereinafter, also referred to as "previous value θ(i−1)") at the time (i−1); and
- a memory 34 that stores the present value θ(i) as the previous value θ(i−1) for using the previous value θ(i−1) to calculate the next present value θ(i) (that is, the oxide film formation amount θ(i+1) at the time (i+1)).

In the present embodiment, a calculation method of θ(i) is not particularly limited, and an optimum method can be selected according to purposes. θ(i) may be calculated from a value obtained in advance in an experiment, or may be calculated using a model equation.

Specific examples of the coating state calculation unit 30a include:
- (a) a means for calculating θ(i) corresponding to Vcat(i) based on the first map created in advance for a relationship between Vcat and θ;
- (b) a means for calculating θ(i) corresponding to Vcat(i) based on the first relational expression created in advance for the relationship between Vcat and θ; and the like.

[3.2.1. First Map]

The "first map" refers to a group of pieces of data indicating the correspondence relationship between Vcat and θ created in advance for a fuel cell of the same specification as the fuel cell that is a target to be controlled. θ depends on not only a present Vcat but also on a previous Vcat (that is, an operation history). Therefore, in order to improve an estimation accuracy of θ(i), it is preferable that the first map can estimate θ(i) based on Vcat(i) and θ(i−1).

When θ(i) is calculated using the first map, a group of pieces of data is acquired in advance for the correspondence relationship between Vcat and θ, and stored in the memory. When the coating state calculation unit 30a acquires Vcat(i) from the catalyst potential calculation unit 20, θ(i) is estimated from Vcat(i), or, Vcat and θ(i−1) using the first map. When there is no data completely matched with Vcat(i) at the time i in the first map, θ(i) is estimated from Vcat(i) using an interpolation method.

[3.2.2. First Relational Expression]

The "first relational expression" refers to a relational expression indicating the correspondence relationship between Vcat and θ created in advance for a fuel cell having the same specification as a fuel cell that is a target to be controlled.

When θ is calculated using the first relational expression, the first relational expression indicating the correspondence relationship between Vcat and θ is stored in advance in the memory. When the coating state calculation unit 30a acquires Vcat(i) from the catalyst potential calculation unit 20, Vcat(i) is substituted into the first relational expression to calculate θ(i).

In the present invention, a type of the first relational expression is not particularly limited, and an optimum relational expression can be selected according to purposes. In particular, the first relational expression is preferably expressed by the following Formula (3) or (4).

[Math. 2]

$$\theta(i) = \theta(i-1) + \Delta T \times \frac{k1(B1 + B2)}{\Gamma} \quad (3)$$
$$B1 = \alpha 1\{1 - \theta(i-1)\} \exp\{\beta 1(V\,cat(i) - E1)\}$$
$$B2 = \alpha 2\theta(i-1) \exp\{\beta 2(V\,cat(i) - E1)\}$$

$$\theta(i) = \frac{1}{1 + \exp\{\gamma 1(V\,cat(i) - E1)\}} \quad (4)$$

where

ΔT is a calculation step width (a period from time (i−1) to time i),

Γ is the maximum amount of surface coating oxygen per unit surface area (a constant), $k_1$ is a rate constant, $E_1$ is an equilibrium potential (a constant), and $\alpha_1$, $\alpha_2$, $\beta_1$, $\beta_2$, and $\gamma_1$ are constants (fitting parameters), respectively.

A second term on the right side of Formula (3) corresponds to an amount of oxide newly formed during ΔT, and the Butler-Bolmer formula is used.

In the second term on the right side, a first term of numerator corresponds to the reaction rate of the oxidation reaction, and represents that the reaction proceeds exponentially with respect to a difference between Vcat and $E_1$ (a reference value of oxidation-reduction potential) in a portion where no oxide is formed (that is, a portion of "1−θ").

On the other hand, in the second term on the right side, the second term of the numerator corresponds to the reaction rate of the reduction reaction (a reverse reaction), indicating that the reaction proceeds exponentially with respect to the difference between Vcat and $E_1$ in a portion where the oxide is formed (that is, a portion of "θ").

Formula (4) is an approximate formula of θ(i) for estimating θ(i) based only on Vcat(i) at the present time i without considering the oxide film formation amount θ(i−1) at the time (i−1). In other words, Formula (4) corresponds to θ when the potential is maintained at a certain potential $E_1$ for a long time in Formula (3). Therefore, Formula (4) is inferior to Formula (3) in the estimation accuracy of θ(i). However, when Formula (4) is used, calculation of θ(i) can be simplified as compared with Formula (3).

[3.3. Command Value Candidate Calculation Unit]

The command value candidate calculation unit 40 is a means for calculating, based on the power command value Pfc_cm(i) to the fuel cell at the time i, a plurality of command value candidates including a combination of an estimated current value I_op(i,X_op) and an estimated total voltage value V_op(i,X_op) from which Pfc_cm(i) is obtained, and a candidate control parameter value X_op(i, Pfc_cm) for realizing I(i,X_op) and V_op(i,X_op).

The "control parameters X" refer to conditions under which the total voltage V and/or the current I can be changed among operating conditions of the fuel cell. Examples of the control parameters X include:
- (a) a gas flow rate, such as a cathode gas flow rate Q, an anode gas flow rate;
- (b) a gas pressure such as a cathode gas pressure Pair, an anode gas pressure, an oxygen/nitrogen partial pressure of cathode gas, and a hydrogen/nitrogen partial pressure of anode gas;
- (c) a temperature Tfc of the fuel cell;
- (d) a humidity RH of the fuel cell; and the like. Any one of these may be used, or two or more thereof may be used in combination as the control parameters X.

Additionally, in the present invention, the "temperature Tfc of the fuel cell" strictly refers to the temperature in the vicinity of the cathode catalyst, but when it is difficult to directly control the temperature in the vicinity of the cathode catalyst, other parameters closely related to the temperature in the vicinity of the cathode catalyst may be substituted. Examples of the parameter equivalent to Tfc include a temperature in the vicinity of an anode catalyst, an inlet temperature or an outlet temperature of cooling water of the fuel cell, a flow rate of cooling water of the fuel cell, and an air volume of cooling air of the fuel cell.

Similarly, the "humidity RH of the fuel cell" strictly refers to the humidity in the vicinity of the cathode catalyst, but when it is difficult to directly control the humidity in the vicinity of the cathode catalyst, other parameters closely related to the humidity in the vicinity of the cathode catalyst may be substituted. Examples of the parameter equivalent to RH include the humidity of cathode gas and the humidity of anode gas.

Among them, as the control parameters X, the cathode gas flow rate Q, the cathode gas pressure Pair, the temperature Tfc of the fuel cell, and/or the humidity RH of the fuel cell are preferred. In particular, as the control parameters X, the cathode gas flow rate Q is preferred. This is because Q is easier to control than the other parameters, and Vcat can be manipulated without causing a serious failure in the fuel cell system even in a case where Q is excessively large or excessively small.

A relationship of Pfc=VI holds among a power Pfc, a total voltage V, and a current I. In other words, there is a plurality of combinations of the current I and the total voltage V for obtaining the predetermined power Pfc.

On the other hand, the current-voltage characteristics of the fuel cell change according to the control parameters X. In other words, by changing the control parameters X, the combination of the current I and the total voltage V can be changed in a relatively wide range while maintaining the power Pfc constant.

The command value candidate calculation unit 40 calculates the plurality of command value candidates including combinations of the estimated current value I_op(i,X_op), the estimated total voltage value V_op(i,X_op), and the candidate control parameter value X_op(i,Pfc_cm) capable of obtaining the power command value Pfc_cm(i). The number of combinations to be calculated is not particularly limited, and an optimum number can be selected according to purposes.

Further, a calculation method of the command value candidates is not particularly limited, and an optimal method can be selected according to purposes. Examples of the command value candidate calculation unit 40 include:

(a) a means for calculating a plurality of command value candidates based on the second map created in advance for a relationship between any one or more control parameters X selected from a group consisting of Q, Pair, Tfc, and RH, and the power Pfc, the total voltage V, and the current I of the fuel cell;

(b) a means for calculating the plurality of command value candidates based on the second relational expression created in advance for a relationship between any one or more control parameters X selected from the group consisting of Q, Pair, Tfc, and RH, and the power Pfc, the total voltage V, and the current I of the fuel cell; and the like.

[3.3.1. Second Map]

The "second map" refers to a group of pieces of data created in advance for a fuel cell having the same specification as that of the fuel cell that is a target to be controlled, and indicating a correspondence relationships among X, Pfc, V, and I.

In a case where the combination of I, V, and X is calculated using the second map, a group of pieces of data indicating the correspondence relationships among X, Pfc, V, and I is acquired in advance and stored in the memory. When the command value candidate calculation unit 40 acquires Pfc_cm(i), the plurality of command value candidates including a combination of I(i,X_op), V_op(i,X_op), and X_op(i,Pfc_cm) for realizing Pfc_cm(i) are calculated using the second map. When there is no data completely matched with Pfc_cm(i) at the time i in the second map, I(i,X_op), V_op(i,X_op), and X_op(i,Pfc_cm) are estimated from Pfc_cm(i) by using the interpolation method.

[3.3.2. Second Relational Expression]

The "second relational expression" is a relational expression indicating the correspondence relationships among X, Pfc, V, and I created in advance for a fuel cell having the same specification as the fuel cell that is a target to be controlled.

When I, V, and X are calculated using the second relational expression, the second relational expression indicating the correspondence relationships among X, Pfc, V, and I is stored in advance in the memory. When the command value candidate calculation unit 40 acquires Pfc_cm(i), Pfc_cm(i) is substituted into the second relational expression to calculate a plurality of command value candidates including the combination of I(i,X_op), V_op(i,X_op), and X_op (i,Pfc_cm) for realizing Pfc_cm(i).

In the present invention, the type of the second relational expression is not particularly limited, and the optimum relational expression can be selected according to purposes.

In particular, the second relational expression is preferably expressed by the following Formula (5) and Formula (6). When Pfc_cm(i) is acquired, I(i,X_op) and V_op(i, X_op) for an arbitrary X_op(i,Pfc_cm) can be calculated by solving simultaneous equations of Formula (5) and Formula (6).

[Math. 3]

$$Pfc\_cm(i) = V\_op(i, X\_op) \times I\_op(i, X\_op) \tag{5}$$

$$V\_op(i, X\_op) = \tag{6}$$

$$N \text{ cell} \times \left\{ V \, ocv(Tfc\_op(i)) - \delta 1 \times (273.15 + Tfc\_op(i)) \times D1 - \delta 2 \times (273.15 + Tfc\_op(i)) \times D2 - R(RH\_op(i)) \times \frac{I\_op(i, X\_op)}{A \text{ cell}} \right\}$$

$$D1 = \log \left\{ \frac{I\_op(i, X\_op)}{A \text{ cell}} \times \frac{1}{I0(Tfc\_op(i))} \right\}$$

$$D2 = \log \left( \frac{Cref(Tfc\_op(i))}{C_{02}(Q\_op(i), Pair\_op(i), Tfc\_op(i), I\_op(i)) - \frac{R \text{ gas} (Pair\_op(i))}{\delta 3} \times \frac{I\_op(i, X\_op)}{A \text{ cell}}} \right)$$

$$V \, ovc(Tfc\_op(i)) = \delta 4 - \delta 5 \times (273.15 + Tfc\_op(i) - \delta 6)$$

$$I0(Tfc\_op(i)) = \delta 7 \times \exp \left\{ \delta 8 \times \left( \frac{1}{\delta 9} - \frac{1}{273.05 + Tfc\_op(i)} \right) \right\}$$

$$Cref(Tfc\_op(i)) = \frac{\delta 9}{273.15 + Tfc\_op(i)}$$

$$Co2(Q\_op(i), Pair\_op(i), Tfc\_op(i), I\_op(i, X\_op)) =$$

$$\frac{\delta 10 \times Pair\_op(i)}{273.15 + Tfc\_op(i)} \times \frac{\delta 11 + \left( Q\_op(i) - \frac{\delta 13 \times I\_op(i, X\_op)}{A \text{ cell}} \right) / Q\_op(i)}{\delta 12}$$

$$R \text{ gas}(Pair\_op(i)) = \frac{Pair\_op(i)}{\delta 13} + \delta 14$$

$$R(RH\_op(i)) = \delta 15 \times RH\_op(i) + \delta 16$$

where $\delta_1$ to $\delta_{16}$ are constants (fitting parameters), respectively.

Formula (5) indicates that Pfc_cm(i) is represented by a product of I_op(i,X_op) and V_op(i,X_op).

Formula (6) is a theoretical formula of the total voltage V of the fuel cell obtained by modifying the Butler-Bolmer formula. In parentheses on the right side of Formula (6), (a) a first term is a theoretical electromotive voltage (Vocv), (b) a second term is an activation overvoltage corresponding to an activation energy required for the reaction, (c) a third term is a concentration overvoltage of the gas (in particular, oxygen in the air) to be used in the reaction, and (d) a fourth term is a resistance overvoltage corresponding to an ohmic loss of the electrolyte.

Additionally, in Formula (6), when only a part of the control parameters X is changed, a candidate value may be used for the control parameters X to be changed, and the measured values may be used for the other control parameters X. For example, when only the cathode gas flow rate Q is used as the control parameters X, a candidate value Q_op(i) is used only for the cathode gas flow rate Q in Formula (6). For the other control parameters X, the measured values, that is, Pair(i), Tfc(i), and RH(i) may be used.

Further, as the second relational expression, any one of the following Formulas (7) to (10) may be used instead of Formula (6). Further in this case, I(i,X_op) and V_op(i, X_op) for an arbitrary X_op(i,Pfc_cm) can be calculated by solving simultaneous equations of Formula (5) and any one of Formula (7) to Formula (10), when Pfc_cm(i) is acquired.

[3.4. Loss Amount Calculation Unit]

The loss amount calculation unit 50 is a means for calculating the estimated value of loss Ploss_op(i,X_op) of the fuel cell for each of the plurality of command value candidates. In the example illustrated in FIG. 1, the loss amount calculation unit 50 calculates the estimated value of loss Ploss_op(i,X_op) of the fuel cell for each combination of Pfc_cm(i), I_op(i,X_op), and V_op(i,X_op).

The command value candidate calculation unit 40 only physically calculates the command value candidates including a combination of I_op(i,X_op) and V_op(i,X_op) capable of realizing Pfc_cm(i), and at that time, efficiency of the fuel cell is not considered at all. Therefore, when a specific command value candidate is randomly selected from the plurality of calculated command value candidates, the efficiency of the fuel cell may be reduced.

[Math. 4]

$$V\_op(i, X\_op) = N\text{cell} \times \left\{ \varepsilon 1 - \varepsilon 2 \times (273.15 + T\text{fc}\_op(i)) \times (F1 + F2) - (\varepsilon 8 \times RH\_op(i) + \varepsilon 9) \times \frac{I\_op(i, X\_op)}{A\text{cell}} \right\} \quad (7)$$

$$F1 = \log\left\{ \frac{I\_op(i, X\_op)}{A\text{cell}} \times \frac{1}{\varepsilon 3} \right\}$$

$$F2 = \log\left( \frac{\varepsilon 4}{\text{Pair}\_op(i) \times \left(1 + \frac{Q\_op(i) - \varepsilon 5 \times \frac{I\_op(i, X\_op)}{A\text{cell}}}{Q\_op(i)}\right) - \left(\frac{\text{Pair}\_op(i)}{\varepsilon 6} + \varepsilon 7\right) \times \frac{I\_op(i, X\_op)}{A\text{cell}}} \right)$$

$$V\_op(i, X\_op) = N\text{cell} \times \left\{ \varepsilon 10 + \varepsilon 11 \times Q\_op(i) + \varepsilon 12 \times \frac{I\_op(i, X\_op)}{A\text{cell}} \right\} \quad (8)$$

$$V\_op(i, X\_op) = N\text{cell} \times \left\{ \varepsilon 13 + \varepsilon 14 \times Q\_op(i) + \varepsilon 15 \times \frac{I\_op(i, X\_op)}{A\text{cell}} + \varepsilon 16 \times Q\_op(i)^2 + \varepsilon 17 \times \left(\frac{I\_op(i, X\_op)}{A\text{cell}}\right)^2 \right\} \quad (9)$$

$$V\_op(i, X\_op) = N\text{cell} \times \left\{ \varepsilon 18 + \varepsilon 19 \times \exp\{\varepsilon 20 \times Q\_op(i)\} + \varepsilon 20 \times \frac{I\_op(i, X\_op)}{A\text{cell}} \right\} \quad (10)$$

where $\varepsilon_1$ to $\varepsilon_{20}$ are constants (fitting parameters), respectively.

Formula (7) is an experimental formula obtained by extracting only a term having a high sensitivity to the control parameters X among the terms described in Formula (6). Formula (7) is less accurate than Formula (6). However, since Formula (7) has fewer fitting parameters than Formula (6), the parameters can be determined from fewer experimental results. Therefore, when Formula (7) is used, calculation costs can be reduced.

Formula (8) is an experimental formula obtained by extracting only a term having a high sensitivity to the cathode gas flow rate Q among the terms described in Formula (6). Since Formula (8) does not use other control parameters X, it is possible to calculate the candidate value with less calculation costs using fewer fitting parameters as compared with cases of using Formulas (6) and (7).

Formula (9) is an experimental formula obtained by incorporating higher-order terms than Formula (8). Although the calculation costs of Formula (9) are increased as compared with Formula (8), the calculation accuracy is improved.

Formula (10) is an experimental formula obtained by incorporating an exp term with respect to Formula (8). Formula (10) is preferably used in a case where test results are easier to describe than Formula (8) and Formula (9).

In the present invention, in order to solve this problem, the estimated value of loss Ploss_op(i,X_op) of the fuel cell is calculated for each of the plurality of command value candidates, and Ploss_op(i,X_op) is considered when a specific command value candidate is selected from the plurality of command value candidates.

In the present invention, a calculation method of Ploss_op(i,X_op) is not particularly limited, and an optimum method can be selected according to purposes. In particular, the loss amount calculation unit 50 preferably calculates Ploss_op(i,X_op) based on the following Formula (11).

[Math. 5]

$$Ploss\_op(i,X\_op) = Vloss \times \{I\_op(i,X\_op) - I0(Pfc\_cm)\} + \{APloss(X\_op) - APloss(X0(Pfc\_cm))\} \quad (11)$$

where $X_0(Pfc\_cm)$ is a reference value of the control parameter corresponding to the Pfc_cm(i), $I_0(Pfc\_cm)$ is a reference value of a current corresponding to the Pfc_cm(i), Vloss is a reference value of the total voltage for calculating the loss, APloss(X_op) is a power loss of the device controlling the control parameters, and APloss($X_0$(Pfc_cm)) is a reference value of the power loss corresponding to the Pfc_cm(i).

A first term on the right side of Formula (11) represents a difference in loss of the fuel cell when the control parameters X change from the reference value $X_0(Pfc\_cm)$ to a candidate value $X\_op(i,Pfc\_cm)$, and the current I thereby changes from the reference value $I_0(Pfc\_cm)$ to a candidate value $I\_op(i,X\_op)$.

A second term on the right side of Formula (11) represents a difference in loss of the device that controls the control parameters (for example, power loss of the cathode gas supply device) when the control parameters X change from the reference value $X_0(Pfc\_cm)$ to the candidate value $X\_op(i,Pfc\_cm)$.

In Formula (11), the value of each reference value is not particularly limited, and an optimum value can be selected according to purposes.

For example, $X_0(Pfc\_cm)$ may be defined as a value of the control parameters X when the power generation efficiency of the fuel cell is prioritized the most. In this case, when the fuel cell is operated at $X_0(Pfc\_cm)$, a current value satisfying $Pfc\_cm(i)$ corresponds to $I_0(Pfc\_cm)$.

Further, for example, when a theoretical voltage of the unit cell is $V_0$ (1 to 1.4 V) and the number of unit cells is Ncell, Vloss can be expressed as $Vloss=V_0 \times Ncell$.

[3.5. Provisional Catalyst Potential Calculation Unit]

The provisional catalyst potential calculation unit 60 is a means for calculating an estimated value of the catalyst potential $Vcat\_op(i,X\_op)$ of the cathode catalyst for each of the plurality of command value candidates. In the example illustrated in FIG. 1, the provisional catalyst potential calculation unit 60 is configured to calculate the estimated value of the catalyst potential $Vcat\_op(i,X\_op)$ of the cathode catalyst for each combination of $I\_op(i,X\_op)$, $V\_op(i,X\_op)$, and $R(i)$.

As described above, the command value candidate calculation unit 40 only physically calculates a command value candidate including the combination of $I\_op(i,X\_op)$ and $V\_op(i,X\_op)$ capable of realizing $Pfc\_cm(i)$, and at that time, deterioration of the cathode catalyst is not considered at all. Therefore, when a specific command value candidate is randomly selected from the plurality of calculated command value candidates, the cathode catalyst may be deteriorated.

In the present invention, in order to solve this problem, the deterioration amount $M\_op(i,X\_op)$ of the cathode catalyst is predicted for each command value candidate, and $M\_op(i,X\_op)$ is considered when a specific command value candidate is selected from the plurality of command value candidates. For this purpose, first, it is necessary to calculate the estimated value of the catalyst potential $Vcat\_op(i,X\_op)$ for each command value candidate.

In the present invention, the calculation method of $Vcat\_op(i,X\_op)$ is not particularly limited, and an optimal method can be selected according to purposes. In particular, the provisional catalyst potential calculation unit 60 preferably calculates $Vcat\_op(i,X\_op)$ based on the following Formula (12) or Formula (13).

Additionally, details of Formula (12) and Formula (13) are similar to Formula (1) and Formula (2), and thus, description thereof is omitted.

[Math. 6]

$$V cat\_op(i, X\_op) = \frac{V\_op(i, X\_op)}{N \text{ cell}} + \frac{I\_op(i, X\_op)}{A \text{ cell}} \times \frac{R(i) \times A \text{ cell}}{N \text{ cell}} \quad (12)$$

-continued $$V cat\_op(i, X\_op) = \frac{V\_op(i, X\_op)}{N \text{ cell}} \quad (13)$$

where

Ncell is the number of unit cells of the fuel cell, and

Acell is the area of the unit cell.

[3.6. Deterioration Amount Calculation Unit]

The deterioration amount calculation unit 70 is a means for calculating the estimated value of a deterioration amount $M\_op(i,X\_op)$ of the fuel cell for each of the plurality of command value candidates. In the example illustrated in FIG. 1, the deterioration amount calculation unit 70 is configured to calculate the estimated value of the deterioration amount $M\_op(i,X\_op)$ of the fuel cell for each combination of $Vcat\_op(i,X\_op)$ and $\theta(i)$.

In the present invention, a calculation method of $M\_op(i,X\_op)$ is not particularly limited, and an optimal method can be selected according to purposes. In particular, the deterioration amount calculation unit 70 preferably calculates $M\_op(i,X\_op)$ based on the following Formula (14).

[Math. 7]

$$M\_op(i,X\_op)=\{1-\theta(i)\} \times Fdiss\{Vcat\_op(i,X\text{-}op)\} \quad (14)$$

where Fdiss is a dissolution rate of the cathode catalyst.

Fdiss is largely dependent on Vcat. Therefore, when $M\_op(i,X\_op)$ is calculated using Formula (14), Fdiss is represented as a function of Vcat in advance using the model equation or experimental results, and this is stored in the memory. When the deterioration amount calculation unit 70 acquires $Vcat\_op(i,X\_op)$ and $\theta(i)$, these are substituted into Formula (14) to calculate $M\_op(i,X\_op)$.

When Fdiss is represented by the function of Vcat, the relational expression is not particularly limited as long as Fdiss can be uniquely obtained from Vcat. In particular, Fdiss is preferably represented by the following Formula (15).

[Math. 8]

$$Fdiss=k_2 \times \exp\{\beta_3[Vcat(i)-E2]\} \quad (15)$$

where $k_2$ is a rate constant, $E_2$ is an equilibrium potential (a constant), and $\beta_3$ is a constant (a fitting parameter).

[3.7. Command Value Calculation Unit]

The command value calculation unit 80 is a means for calculating a comprehensive index $Y\_op(i,X\_op)$ including $Ploss\_op(i,X\_op)$ and/or $M\_op(i,X\_op)$ for each of the plurality of command value candidates, and selecting a combination of the $X\_op(i,Pfc\_cm)$, the $V\_op(i,X\_op)$, and the $I\_op(i,X\_op)$ with a minimum $Y\_op(i,X\_op)$ from the plurality of command value candidates and outputting the combination as a command value $X\_cm(i)$ of control parameters, a command value $V\_cm(i)$ of the total voltage, and a command value $I\_cm(i)$ of the current.

The "comprehensive index $Y\_op(i,X\_op)$" is a determination index when a specific command value candidate is selected from the plurality of command value candidates, and refers to an index in which at least the loss $Ploss\_op(i,X\_op)$ and/or the deterioration amount $M\_op(i,X\_op)$ are considered. $Y\_op(i,X\_op)$ may be one in which an oxide retention term is further considered in addition to $Ploss\_op(i,X\_op)$ and/or $M\_op(i,X\_op)$.

Specifically, the command value calculation unit preferably calculates Y_op(i,X_op) based on the following Formula (16) or (17).

[Math. 9]

$$Y\_op(i,X\_op)=m1\times Ploss\_op(i,X\_op)+m2\times M\_op(i,X\_op) \quad (16)$$

$$Y\_op(i,X\_op)=m1\times Ploss\_op(i,X\_op)+m2\times M\_op(i,X\_op)+m3\times\theta(i)\times\{Vth-Vcat\_op(i,X\_op)\} \quad (17)$$

where
$m_1$ is a weighting coefficient for the Ploss_op(i,X_op),
$m_2$ is a weighting coefficient for the M_op(i,X_op),
Vth is a threshold value,
$\theta(i)\times(Vth-Vcat\_op(i,X\_op))$ is an oxide retention term, and
$m_3$ is a weighting coefficient for the oxide retention term, and $m_3=0$ holds when $Vth-Vcat\_op(i,X\_op)<0$ holds, and $m_3>0$ holds when $Vth-Vcat\_op(i,X\_op)\geq 0$ holds.

[3.7.1. Formula (16)]

Formula (16) represents the comprehensive index Y_op(i,X_op) in which only Ploss_op(i,X_op) and M_op(i,X_op) are considered. In Formula (16), the values of the weighting coefficients $m_1$ and $m_2$ are not particularly limited, and optimum values can be selected according to purposes.

For example, in Formula (16), in a case where $m_1=0$ and $m_2>0$ hold, a combination of X_cm(i), V_cm(i), and I_cm(i) with a minimum M_op(i,X_op) is selected. Conversely, in a case where $m_1>0$ and $m_2=0$ hold, a combination of X_cm(i), V_cm(i), and I_cm(i) with a minimum Ploss_op(i,X_op) is selected.

Furthermore, in a case where $m_1>0$ and $m_2>0$ hold, a combination of X_cm(i), V_cm(i), and I_cm(i) in which both Ploss_op(i,X_op) and M_op(i,X_op) are moderately reduced is selected by optimizing the magnitudes of both $m_1$ and $m_2$.

[3.7.2. Formula (17)]

In addition to Ploss_op(i,X_op) and M_op(i,X_op), Formula (17) represents the comprehensive index Y_op(i,X_op) in which the oxide retention term is further considered. In Formula (17), the values of the weighting coefficients $m_1$, $m_2$, and $m_3$ are not particularly limited, and optimum values can be selected according to purposes.

In the present invention, when $\theta(i)$ is small, the power generation is basically performed in a state (the high load state) in which the total voltage V(i) is lowered in order to suppress the deterioration of the cathode catalyst. On the other hand, when the total voltage V(i) becomes smaller, the oxide film may be removed at the moment or in the subsequent power generation process, which may accelerate the deterioration of the cathode catalyst. The potential of oxidation-reduction reaction of oxide is approximately 0.5 to 0.8 V. Therefore, by setting the threshold value Vth in the vicinity thereof and considering the oxide retention term, a durability may be further improved depending on use conditions.

In a case where $Vth-Vcat\_op(i,X\_op)<0$ holds, $m_3=0$ is set. This is because otherwise, in minimizing Y_op(i,X_op), the oxide retention term takes a negative value, as a result of which the larger negative value $Vth-Vcat\_op(i,X\_op)$ takes, the better the comprehensive index is. The oxide retention term becomes larger in a case where the oxide disappears. Therefore, in a case where there is no possibility that the oxide disappears (that is, when Vcat>Vth holds), $m_3=0$ is set in order to eliminate the sensitivity to Y_op(i,X_op).

On the other hand, when $Vth-Vcat\_op(i,X\_op)\geq 0$ holds, $m_3>0$ is set. In this case, the oxide retention term becomes larger as $m_3$ becomes larger. Further, as Vcat_op(i,X_op) becomes smaller, Y_op(i,X_op) becomes larger. As a result, the control parameters X_op(i,Pfc_cm) is selected such that Vcat_op(i,X_op) does not become excessively small. The deterioration amount M becomes smaller as Vcat becomes smaller in most of the range. Therefore, although the deterioration amount M instantaneously becomes larger as compared with the case of $m_3=0$, a future deterioration amount M is reduced by maintaining the oxide film.

In a usage in which the operation is performed for a long time and $\theta(i)$ becomes larger, a total deterioration amount M is reduced when $m_3$ is larger. On the other hand, in a usage in which Vcat(i) becomes a low potential due to frequent starting and stopping of the fuel cell, and $\theta(i)$ does not become too large, the total deterioration amount M is reduced when $m_3$ is smaller.

4. Fuel Cell Control Command Device (2)

Figure 2:
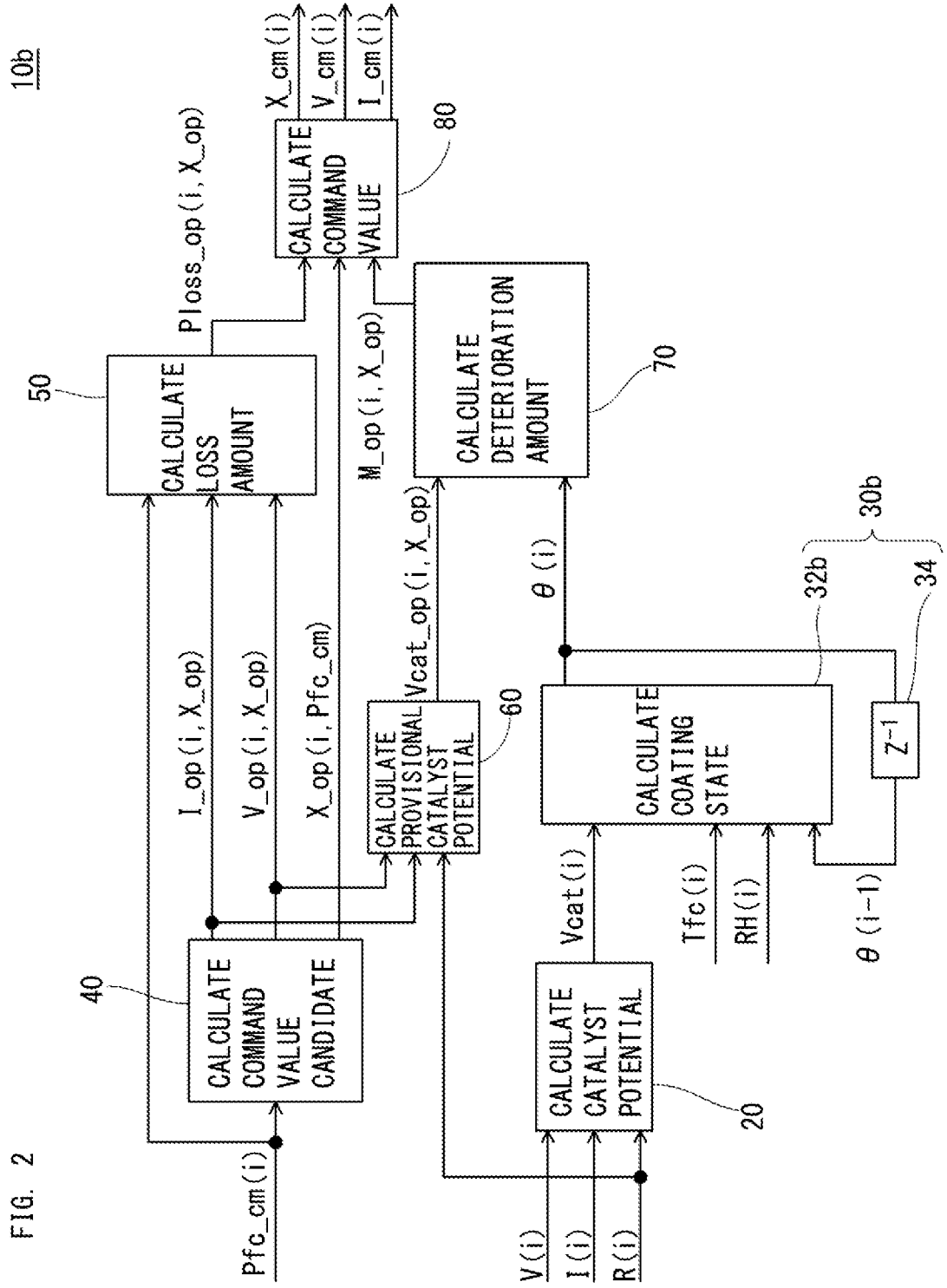
FIG. 2 is a block diagram of a fuel cell control command device according to a second embodiment of the present invention.

FIG. 2 illustrates a block diagram of a fuel cell control command device according to a second embodiment of the present invention. In FIG. 2, a fuel cell control command device 10b includes the catalyst potential calculation unit 20, a coating state calculation unit 30b, the command value candidate calculation unit 40, the loss amount calculation unit 50, the provisional catalyst potential calculation unit 60, the deterioration amount calculation unit 70, and the command value calculation unit 80.

[4.1. Catalyst Potential Calculation Unit, Command Value Candidate Calculation Unit, Loss Amount Calculation Unit, Provisional Catalyst Potential Calculation Unit, Deterioration Amount Calculation Unit, and Command Value Calculation Unit]

Since the catalyst potential calculation unit 20, the command value candidate calculation unit 40, the loss amount calculation unit 50, the provisional catalyst potential calculation unit 60, the deterioration amount calculation unit 70, and the command value calculation unit 80 are the same as those of the first embodiment, the description thereof will be omitted.

[4.2 Coating State Calculation Unit]

In FIG. 2, the coating state calculation unit 30b includes:
a main circuit 32b for calculating the oxide film formation amount $\theta(i)$ at the time i from Vcat(i), the oxide film formation amount $\theta(i-1)$ at the time (i-1), the temperature Tfc(i) of the fuel cell, and the humidity RH(i) of the fuel cell; and
the memory 34 that stores the present value $\theta(i)$ as the previous value $\theta(i-1)$ for using the previous value $\theta(i-1)$ to calculate the next present value $\theta(i)$ (that is, the oxide film formation amount $\theta(i+1)$ at the time (i+1)).

In other words, the coating state calculation unit 30b is configured to calculate $\theta(i)$ based on Vcat(i), $\theta(i-1)$, Tfc(i), and RH(i). The second embodiment is different from the first embodiment in this point. Since a dissolution/precipitation reaction of an oxide film is a chemical reaction, $\theta(i)$ also depends on Tfc(i). Further, since the dissolution/precipitation of the oxide film is performed via water, $\theta(i)$ also depends on RH(i). Therefore, when Tfc(i) and RH(i) are further considered in addition to Vcat(i) and $\theta(i-1)$ in calculating $\theta(i)$, the estimation accuracy of $\theta(i)$ is further improved.

In the present embodiment, a calculation method of $\theta(i)$ is not particularly limited, and an optimum method can be selected according to purposes. $\theta(i)$ may be calculated from a value obtained in advance in an experiment, or may be calculated using the model equation.

Specific examples of the coating state calculation unit 30b includes:

(a) a means for calculating θ(i) corresponding to Vcat(i), Tfc(i), and RH(i) based on the third map created in advance for the relationships among Vcat, θ, Tfc, and RH;

(b) a means for calculating θ(i) corresponding to Vcat(i), Tfc(i), and RH(i) based on the third relational expression created in advance for the relationships among Vcat, θ, Tfc, and RH;

and the like.

[4.2.1. Third Map]

The "third map" refers to a group of pieces of data indicating the correspondence relationships among Vcat, θ, Tfc, and RH that is created in advance for a fuel cell of the same specification as the fuel cell that is a target to be controlled.

In the third map, Tfc and RH are further considered in addition to Vcat and θ. The third map is different from the first map in this point. Other matters related to the third map are similar to those of the first map, and thus description thereof is omitted.

[4.2.2. Third Relational Expression]

The "third relational expression" refers to a relational expression indicating the correspondence relationships among Vcat, θ, Tfc, and RH that is created in advance for a fuel cell of the same specification as the fuel cell that is a target to be controlled.

When θ is calculated using the third relational expression, the third relational expression indicating the correspondence relationships among Vcat, θ, Tfc, and RH is stored in the memory in advance. When the coating state calculation unit 30b acquires Vcat(i), Tfc(i), RH(i), and θ(i−1), these are substituted into the third relational expression to calculate θ(i).

In the present invention, the type of the third relational expression is not particularly limited, and the optimum relational expression can be selected according to purposes. The relational expression of θ(i) in consideration of Tfc and RH is described in, for example, Reference Literature 1.

[Reference Literature 1] Darling, R. M. and J. P. Meyers (2003), "Kinetic Model of Platinum Dissolution in PEMFCs," Journal of the Electrochemical Society 150 (11)

5. Effects

[5.1. Deterioration of Catalyst]

Figure 3:
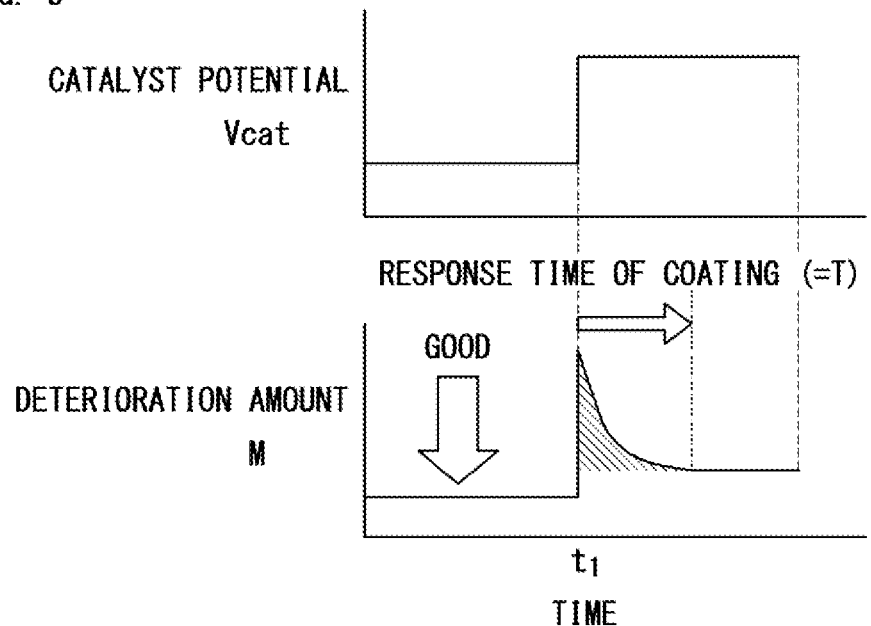
FIG. 3 is a schematic diagram of a temporal change in a deterioration amount M of catalyst particles when a catalyst potential Vcat changes stepwise.

FIG. 3 illustrates a schematic diagram of a temporal change in the deterioration amount M of catalyst particles when the catalyst potential Vcat changes stepwise. The catalyst particles have deterioration characteristics as shown in FIG. 3. An upper part of FIG. 3 shows an example in which the voltage V (that is, the catalyst potential Vcat) of the fuel cell becomes larger stepwise. A lower part of FIG. 3 shows a state in which the deterioration amount M of the catalyst particles changes with time as a result of input of Vcat in the upper part. The deterioration amount M corresponds to a dissolution rate of catalyst and can be obtained by the model equation or experiment. Formulas (14) and (15) described above are examples of the model equation.

Figure 4:
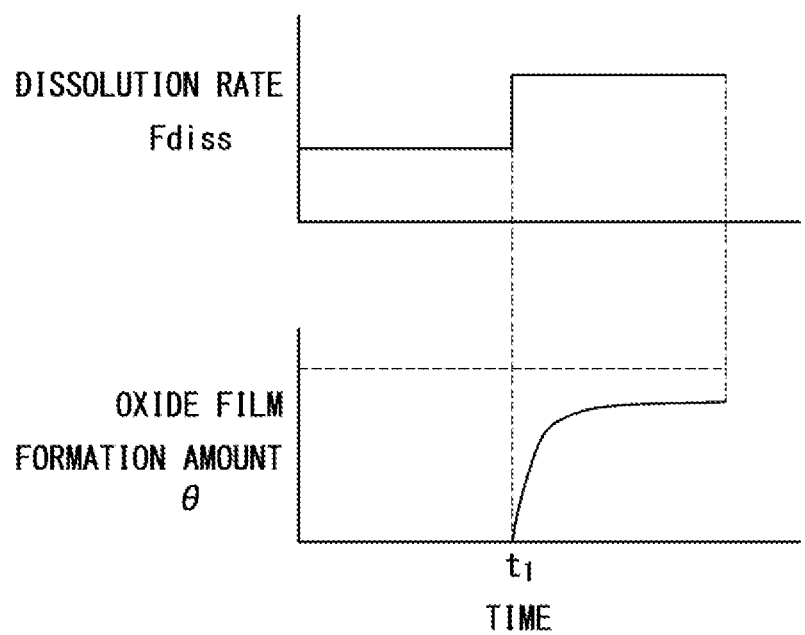
FIG. 4 is a schematic diagram of a temporal change in a dissolution rate Fdiss and an oxide film formation amount θ when the catalyst potential Vcat changes stepwise.

FIG. 4 illustrates a schematic diagram of a temporal change in the dissolution rate Fdiss and the oxide film formation amount θ when the catalyst potential Vcat changes stepwise. FIG. 4 is a diagram drawing the dissolution rate Fdiss and the oxide film formation amount θ so as to correspond to FIG. 3. As shown in an upper part of FIG. 4, as Vcat becomes larger, Fdiss becomes larger. On the other hand, as shown in a lower part of FIG. 4, when Vcat becomes larger, the oxide film is formed on surfaces of catalyst particles with a delay. As the oxide film is formed (that is, as θ becomes larger), the dissolution of catalyst particles, that is, the deterioration amount M is suppressed as shown in the lower part of FIG. 3.

As can be seen from FIGS. 3 and 4, when the cathode catalyst is exposed to the high potential, catalyst components are easily eluted from the cathode catalyst. On the other hand, when the cathode catalyst is exposed to the high potential, the oxide film is formed on the surface of the cathode catalyst, and the elution of the catalyst components from the cathode catalyst is suppressed. However, since a formation rate of the oxide film is slow, when the potential of the cathode rapidly fluctuates, the oxide film formation is delayed, and the catalyst components are likely to be eluted from the cathode catalyst. In other words, when the fuel cell is continuously used in an environment where the potential fluctuation is repeated, the cathode catalyst is eventually deteriorated.

[5.2. Suppression of Catalyst Deterioration Using Control Parameters X]

Figure 5:
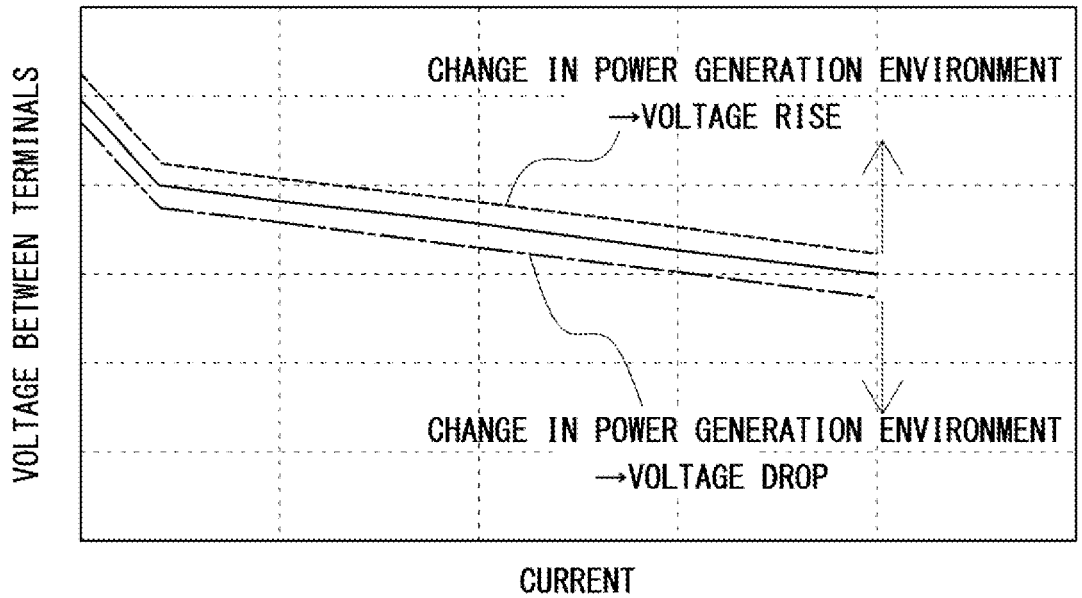
FIG. 5 is a schematic diagram of a change in current-voltage characteristics of the fuel cell accompanying a change in control parameters X.

FIG. 5 illustrates a schematic diagram showing a change in the current-voltage characteristics of the fuel cell accompanying the change in the control parameters X. The current-voltage (a voltage between terminals of a unit cell) characteristics of the fuel cell basically becomes a curve in which the voltage V becomes smaller as the current I becomes larger (that is, the power generation amount, which is approximately equal to the power demand value, becomes lager). This IV characteristic usually rises or falls when a power generation environment changes.

Figure 6:
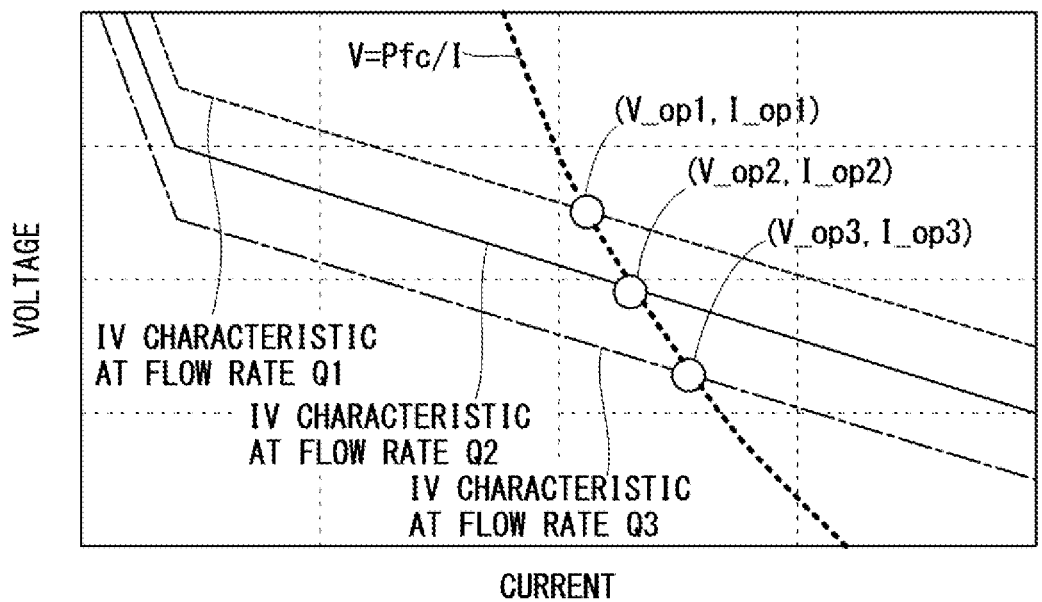
FIG. 6 is a schematic diagram of a change in the current-voltage characteristics accompanying a change in a cathode gas flow rate Q.

FIG. 6 illustrates a schematic diagram showing a change in the current-voltage characteristics accompanying a change in the cathode gas flow rate Q. A relationship of Pfc=VI holds among a required power Pfc, the total voltage V, and the current I. In other words, there is a plurality of combinations of the current I and the total voltage V for obtaining the predetermined power Pfc.

On the other hand, the current-voltage characteristics of the fuel cell change according to the control parameters X. For example, in a case where the cathode gas flow rate Q is used as the control parameters X for changing the IV characteristic, as shown in FIG. 6, when Q is increased, the IV characteristic rises, and when Q is decreased, the IV characteristic lowers. In other words, by changing the control parameters X, the combination of the current I and the total voltage V can be changed in a relatively wide range while maintaining the power Pfc constant.

Specifically, as shown in FIG. 6, when an equal power line (a curve of V=Pfc/I) is drawn on the I-V characteristics, a first candidate value (V_op1, I_op1) of V and I for obtaining Pfc can be obtained from an intersection of the IV characteristic when the cathode gas flow rate is $Q_1$ and the equal power line.

Similarly, a second candidate value (V_op2, I_op2) for obtaining Pfc can be obtained from an intersection of the IV characteristic when the cathode gas flow rate is $Q_2$ and the equal power line.

Hereinafter, similarly, a plurality of command value candidate values including combinations of Q, V, and I for obtaining Pfc can be calculated.

The same applies to a case where the control parameters X other than Q are used.

For example, when the cathode gas pressure Pair is used as the control parameters X, normally, the IV characteristic rises as Pair becomes larger. However, when Pair is excessively large, generated water tends to be retained as liquid water due to an increase in pressure, and this may inhibit a supply of oxygen and reduce the potential.

Further, in a case where the temperature Tfc of the fuel cell is used as the control parameters X, the IV characteristic usually rises as Tfc becomes larger. However, when Tfc is excessively high, the electrolyte is dried. As a result, the potential drops as Tfc becomes larger at a certain current operating point, and the potential becomes larger as Tfc becomes larger at a certain current operating point.

Furthermore, when the humidity RH of the fuel cell is used as the control parameters X, the IV characteristic usually rises as RH becomes larger. However, when RH excessively rises, the generated water tends to be retained as liquid water, and this may inhibit the supply of oxygen and reduce the potential.

[5.3. Selection of Command Value]

The command value candidate obtained as described above merely physically calculates a combination of the current I, the total voltage V, and the control parameters X that can realize Pfc, and at that time, the efficiency of fuel cell and the deterioration of cathode catalyst are not considered. Therefore, when a specific command value candidate is randomly selected from the plurality of calculated command value candidates, the efficiency of fuel cell may drop or the cathode catalyst may deteriorate.

On the other hand, when the oxide film formation amount of cathode catalyst θ(i) is sequentially calculated, the deterioration amount of cathode catalyst M_op(i,X_op) when the control parameter X_op(i,Pfc_cm) is changed can be estimated. Further, when a candidate value V_op(i,X_op) of the total voltage and a candidate value I_op(i,X_op) of the current are known, the loss Ploss_op(i,X_op) of the fuel cell when these candidate values are selected can be estimated.

Therefore, when the oxide film formation amount θ is small, by controlling the control parameters X to make the catalyst potential Vcat become small, the power generation can be performed under the low potential condition in which the deterioration of cathode catalyst is small while maintaining the power P at the required value Pfc.

On the other hand, when the oxide film formation amount θ is large, by controlling the control parameters X to make the catalyst potential Vcat become large, the power generation can be performed under the high potential condition with high efficiency while maintaining the power P at the required value Pfc.

[5.4. Adjustment of Deterioration Amount and Fuel Efficiency Using Weighting Coefficients]

Which one of the plurality of command value candidates should be selected as the command value depends on the application of the system in which the fuel cell is mounted. In applications where durability is emphasized, a command value candidate with the smallest deterioration amount M should be selected as a command value. On the other hand, in an application in which fuel efficiency is emphasized, a command value candidate with the smallest loss Ploss should be selected as a command value.

By using the comprehensive index described above, it is possible to adjust whether to emphasize efficiency or durability by adjusting the values of the weighting coefficients $m_1$, $m_2$, and $m_3$.

When the weighting coefficient $m_1$ for the loss Ploss is larger than the weighting coefficient $m_2$ for the deterioration amount M, the fuel efficiency is prioritized. Conversely, when $m_2$ is larger than $m_1$, the durability is prioritized. Further, when the values of $m_1$ and $m_2$ are optimized, the durability can be significantly improved without significantly reducing the fuel efficiency. Furthermore, when the weighting coefficient $m_3$ for the oxide retention term is considered, the use conditions will be considered, so that the durability of cathode catalyst may be further improved.

EXAMPLES

Example 1

1. Test Method

The deterioration amount and the fuel efficiency were obtained by simulation when the command value was selected using the comprehensive index expressed by the Formula (16) above. The cathode gas flow rate Q was used as the control parameters X. The weighting coefficient $m_1$ for the loss Ploss was fixed to a constant value, and the weighting coefficient $m_2$ for the deterioration amount M was changed in a range of 0 to 0.5.

2. Results

Figure 7:
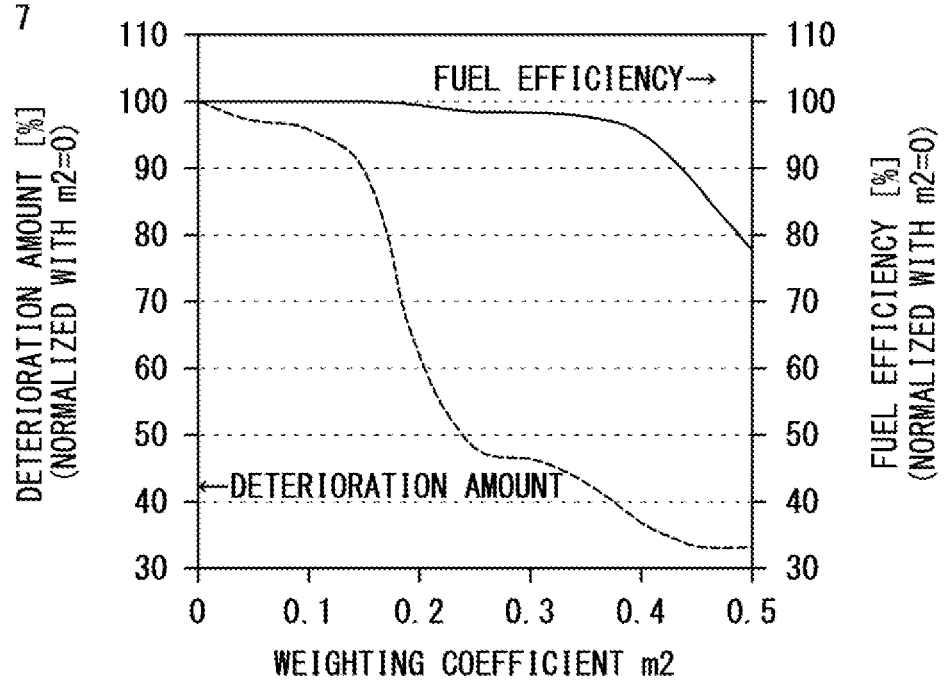
FIG. 7 is a diagram illustrating a relationship between a weighting coefficient $m_2$ for a deterioration amount and a deterioration amount or fuel efficiency when a weighting coefficient $m_1$ for a loss is fixed.
Figure 8A:
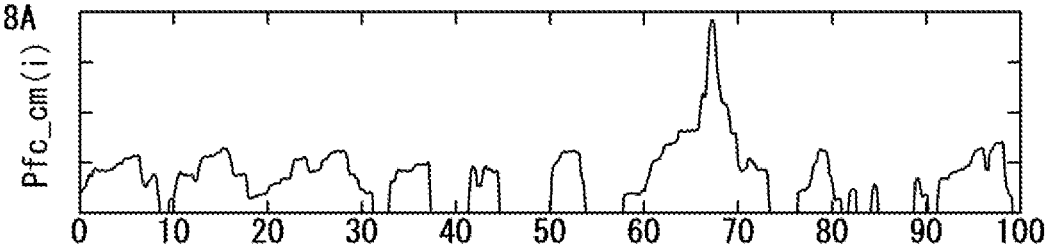
FIG. 8A is a schematic diagram of a change in a power command value Pfc_cm(i)
Figure 8B:
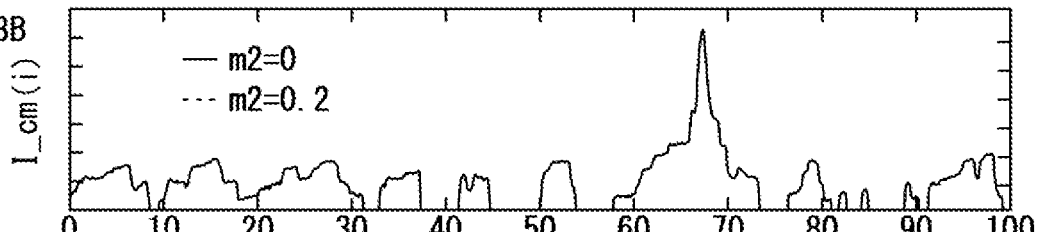
FIG. 8B is a schematic diagram of a change in a command value I_cm(i) of a current accompanying a change in the power command value Pfc_cm(i) when $m_2$=0 or 0.2 holds.
Figure 8C:
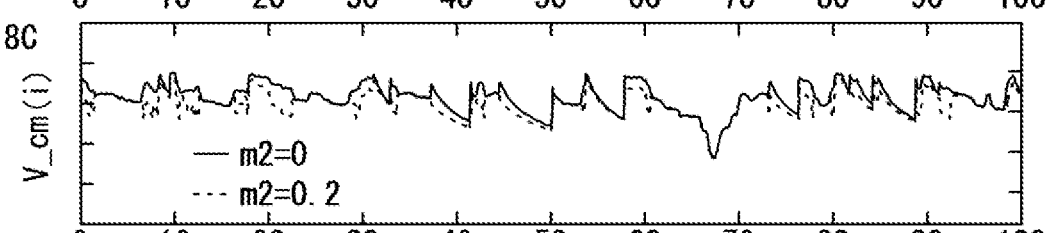
FIG. 8C is a schematic diagram of a change in a command value V_cm(i) of a total voltage accompanying a change in the power command value Pfc_cm(i) when $m_2$=0 or 0.2 holds.
Figure 8D:
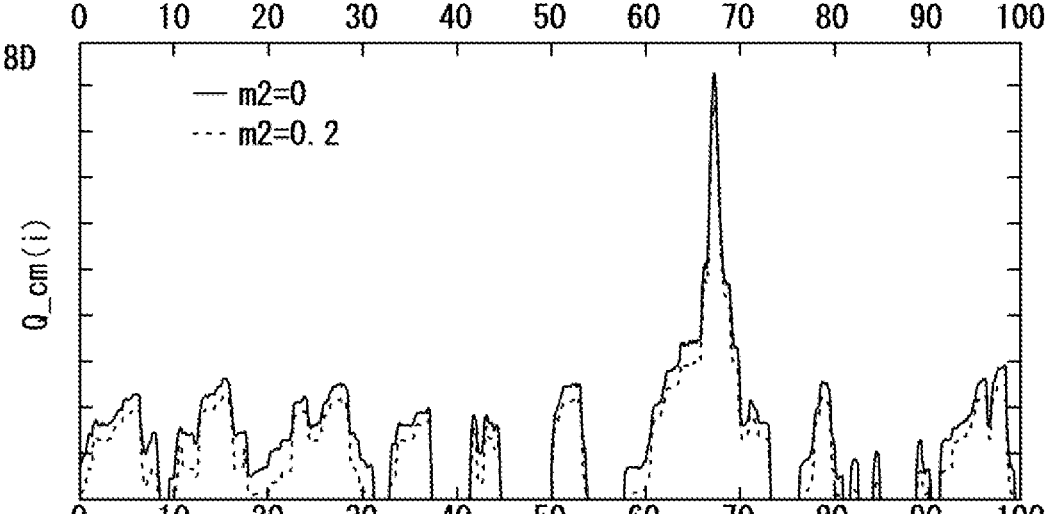
FIG. 8D is a schematic diagram of a change in a command value Q_cm(i) of a cathode gas flow rate accompanying a change in the power command value Pfc_cm(i) when $m_2$=0 or 0.2 holds.
Figure 8E:
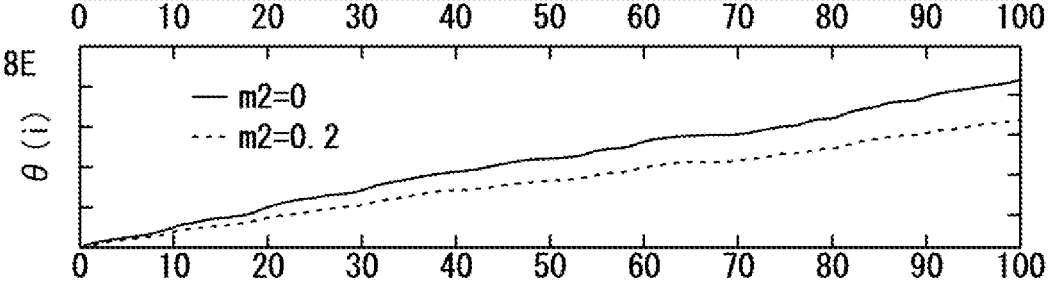
FIG. 8E is a schematic diagram of a change in an oxide film formation amount θ(i) accompanying a change in the power command value Pfc_cm(i) when $m_2$=0 or 0.2 holds.

FIG. 7 illustrates the relationship between the weighting coefficient $m_2$ for the deterioration amount and the deterioration amount or the fuel efficiency when the weighting coefficient $m_1$ for the loss is fixed. Additionally, in FIG. 7, both the deterioration amount and the fuel efficiency are normalized by a value when $m_2$=0 holds.

As can be seen from FIG. 7, when $m_2$=0.2 holds, the fuel efficiency is hardly reduced as compared with when $m_2$=0 holds, and the deterioration amount can be reduced by about 40% (the durability is improved by 1.6 times). Further, it is found that when $m_2$ is further increased, the fuel efficiency is reduced but the durability is further improved.

FIGS. 8A to 8E illustrate:
(a) a schematic diagram of a change in the power command value Pfc_cm(i); and
(b) a schematic diagram of a change in the command value of the current I_cm(i), the command value of the total voltage V_cm(i), the command value of the cathode gas flow rate Q_cm(i), or the oxide film formation amount θ(i) accompanying a change in the power command value Pfc_cm(i) when $m_2$=0 or 0.2 holds. According to FIG. 8, the following can be seen.
(1) In a case where θ(i) is small, the cathode gas flow rate Q_cm(i) when $m_2$=0.2 holds is smaller than that when $m_2$=0 holds. As a result, the total voltage V_cm(i) when $m_2$=0.2 holds was lower than that when $m_2$=0 holds. This indicates that the suppression of the deterioration amount M is prioritized.
(2) In a case where θ(i) is large (θ(i) being almost the same as 1), the total voltage V_cm(i) when $m_2$=0.2 holds is substantially equal to that when $m_2$=0 holds. This is because in a case where θ(i) is large, the deterioration amount M becomes smaller, and thus, a control with priority on efficiency is performed even when $m_2$=0.2 holds.

Although the embodiments of the present invention have been described in detail above, the present invention is not limited to the embodiments above at all, and various modifications can be made without departing from the gist of the present invention.

The fuel cell control command device according to the present invention can be used for power generation control of a fuel cell vehicle.

What is claimed is:

1. A fuel cell control command device comprising:
    (1) a catalyst potential calculation unit configured to calculate a catalyst potential Vcat(i) of a cathode catalyst of a fuel cell based on at least a total voltage V(i) at a time i of the fuel cell;
    (2) a coating state calculation unit configured to calculate an oxide film formation amount θ(i) of the cathode catalyst at the time i based on at least the Vcat(i);
    (3) a command value candidate calculation unit configured to calculate, based on a power command value Pfc_cm(i) to the fuel cell at the time i, a plurality of command value candidates including a combination of an estimated current value I_op(i,X_op) and an estimated total voltage value V_op(i,X_op) from which the Pfc_cm(i) is obtained, and a candidate control parameter value X_op(i,Pfc_cm) for realizing the I(i,X_op) and the V_op(i,X_op);
    (4) a loss amount calculation unit configured to calculate an estimated value of loss Ploss_op(i,X_op) of the fuel cell for each of the plurality of command value candidates;
    (5) a provisional catalyst potential calculation unit configured to calculate an estimated value of catalyst potential Vcat_op(i,X_op) of the cathode catalyst for each of the plurality of command value candidates;
    (6) a deterioration amount calculation unit configured to calculate an estimated value of a deterioration amount M_op(i,X_op) of the fuel cell for each of the plurality of command value candidates; and
    (7) a command value calculation unit configured to calculate a comprehensive index Y_op(i,X_op) including the Ploss_op(i,X_op) and/or the M_op(i,X_op) for each of the plurality of command value candidates, and select a combination of the X_op(i,Pfc_cm), the V_op(i, X_op), and the I_op(i,X_op) with the smallest Y_op(i, X_op) from the plurality of command value candidates and output the selected combination as a command value X_cm(i) of control parameter, a command value V_cm(i) of total voltage, and a command value I_cm(i) of current.

2. The fuel cell control command device according to claim 1, wherein the catalyst potential calculation unit calculates the Vcat(i) based on the following Formula (1) or Formula (2):

[Math. 1]

$$V\,cat(i) = \frac{V(i)}{N\,\text{cell}} + \frac{I(i)}{A\,\text{cell}} \times \frac{R(i) \times A\,\text{cell}}{N\,\text{cell}} \quad (1)$$

$$V\,cat(i) = \frac{V(i)}{N\,\text{cell}} \quad (2)$$

where
Ncell is the number of unit cells of the fuel cell, and
Acell is an area of the unit cell.

3. The fuel cell control command device according to claim 1, wherein
    the coating state calculation unit calculates the θ(i) corresponding to the Vcat(i) based on a first map or a first relational expression that is created in advance for a relationship between the catalyst potential Vcat and an oxide film formation amount θ.

4. The fuel cell control command device according to claim 3, wherein the first relational expression is expressed by the following Formula (3) or Formula (4):

[Math. 2]

$$\theta(i) = \theta(i-1) + \Delta T \times \frac{k1(B1 + B2)}{\Gamma} \quad (3)$$

$$B1 = \alpha 1\{1 - \theta(i-1)\} \exp\{\beta 1(V\,cat(i) - E1)\}$$
$$B2 = \alpha 2\theta(i-1) \exp\{\beta 2(V\,cat(i) - E1)\}$$

$$\theta(i) = \frac{1}{1 + \exp\{\gamma 1(V\,cat(i) - E1)\}} \quad (4)$$

where
ΔT is a calculation step width,
Γ is a maximum amount of surface coating oxygen per unit surface area (a constant),
$k_1$ is a rate constant,
$E_1$ is an equilibrium potential (a constant), and
$\alpha_1$, $\alpha_2$, $\beta_1$, $\beta_2$, and $\gamma_1$ are constants (fitting parameters), respectively.

5. The fuel cell control command device according to claim 1, wherein
    the command value candidate calculation unit calculate the plurality of command value candidates based on a second map or a second relational expression that is created in advance for a relationship between any one or more control parameters X selected from a group consisting of a cathode gas flow rate Q, a cathode gas pressure Pair, a temperature Tfc of the fuel cell, and a humidity RH of the fuel cell, and a power Pfc, a total voltage V, and a current I of the fuel cell.

6. The fuel cell control command device according to claim 5, wherein the second relational expression is expressed by the following Formula (5) and Formula (6):

[Math. 3]

$$Pfc\_cm(i) = V\_op(i, X\_op) \times I\_op(i, X\_op) \quad (5)$$

$$V\_op(i, X\_op) = \quad (6)$$

$$N\,\text{cell} \times \Big\{ V\,ocv(\text{Tfc\_op}(i)) - \delta 1 \times (273.15 + \text{Tfc\_op}(i)) \times D1 -$$
$$\delta 2 \times (273.15 + \text{Tfc\_op}(i)) \times D2 - R(\text{RH\_op}(i)) \times \frac{I\_op(i, X\_op)}{A\,\text{cell}} \Big\}$$

$$D1 = \log\left\{ \frac{I\_op(i, X\_op)}{A\,\text{cell}} \times \frac{1}{I0(\text{Tfc\_op}(i))} \right\}$$

$$D2 = \log\left( \frac{Cref(\text{Tfc\_op}(i))}{C_{02}(Q\_op(i), \text{Pair\_op}(i), \text{Tfc\_op}(i), I\_op(i)) - \frac{R\,\text{gas}\,(\text{Pair\_op}(i))}{\delta 3} \times \frac{I\_op(i, X\_op)}{A\,\text{cell}}} \right)$$

$$V\,ovc(\text{Tfc\_op}(i)) = \delta 4 - \delta 5 \times (273.15 + \text{Tfc\_op}(i) - \delta 6)$$

$$I0(\text{Tfc\_op}(i)) = \delta 7 \times \exp\left\{ \delta 8 \times \left( \frac{1}{\delta 9} - \frac{1}{273.05 + \text{Tfc\_op}(i)} \right) \right\}$$

$$Cref(\text{Tfc\_op}(i)) = \frac{\delta 9}{273.15 + \text{Tfc\_op}(i)}$$

$$Co2(Q\_op(i), \text{Pair\_op}(i), \text{Tfc\_op}(i), I\_op(i, X\_op)) =$$

$$\frac{\delta 10 \times \text{Pair\_op}(i)}{273.15 + \text{Tfc\_op}(i)} \times \frac{\delta 11 + \left( Q\_op(i) - \frac{\delta 13 \times I\_op(i, X\_op)}{A\,\text{cell}} \right) / Q\_op(i)}{\delta 12}$$

$$R\,\text{gas}(\text{Pair\_op}(i)) = \frac{\text{Pair\_op}(i)}{\delta 13} + \delta 14$$

$$R(\text{RH\_op}(i)) = \delta 15 \times \text{RH\_op}(i) + \delta 16$$

where $\delta_1$ to $\delta_{16}$ are constants (fitting parameters), respectively.

7. The fuel cell control command device according to claim 6, wherein the second relational expression uses any one of the following Formula (7) to Formula (10) instead of Formula (6):

[Math. 4]

$$V\_op(i, X\_op) = N\text{cell} \times \left\{ \varepsilon 1 - \varepsilon 2 \times (273.15 + \text{Tfc\_op}(i)) \times (F1 + F2) - (\varepsilon 8 \times \text{RH\_op}(i) + \varepsilon 9) \times \frac{I\_op(i, X\_op)}{A\text{cell}} \right\} \quad (7)$$

$$F1 = \log\left\{ \frac{I\_op(i, X\_op)}{A\text{cell}} \times \frac{1}{\varepsilon 3} \right\}$$

$$F2 = \log\left( \frac{\varepsilon 4}{\text{Pair\_op}(i) \times \left(1 + \frac{Q\_op(i) - \varepsilon 5 \times \frac{I\_op(i, X\_op)}{A\text{cell}}}{Q\_op(i)}\right) - \left(\frac{\text{Pair\_op}(i)}{\varepsilon 6} + \varepsilon 7\right) \times \frac{I\_op(i, X\_op)}{A\text{cell}}} \right)$$

$$V\_op(i, X\_op) = N\text{cell} \times \left\{ \varepsilon 10 + \varepsilon 11 \times Q\_op(i) + \varepsilon 12 \times \frac{I\_op(i, X\_op)}{A\text{cell}} \right\} \quad (8)$$

$$V\_op(i, X\_op) = \quad (9)$$

$$N\text{cell} \times \left\{ \varepsilon 13 + \varepsilon 14 \times Q\_op(i) + \varepsilon 15 \times \frac{I\_op(i, X\_op)}{A\text{cell}} + \varepsilon 16 \times Q\_op(i)^2 + \varepsilon 17 \times \left(\frac{I\_op(i, X\_op)}{A\text{cell}}\right)^2 \right\}$$

$$V\_op(i, X\_op) = N\text{cell} \times \left\{ \varepsilon 18 + \varepsilon 19 \times \exp\{\varepsilon 20 \times Q\_op(i)\} + \varepsilon 20 \times \frac{I\_op(i, X\_op)}{A\text{cell}} \right\} \quad (10)$$

where $\varepsilon_1$ to $\varepsilon_{20}$ are constants (fitting parameters), respectively.

8. The fuel cell control command device according to claim 1, wherein the loss amount calculation unit calculates the Ploss_op(i,X_op) based on the following Formula (11):

[Math. 5]

$$Ploss\_op(i,X\_op)=Vloss\times\{I\_op(i,X\_op)-I0(Pfc\_cm)\}+\{APloss(X\_op)-APloss(X0(Pfc\_cm))\} \quad (17)$$

where $X_0(\text{Pfc\_cm})$ is a reference value of the control parameter corresponding to the Pfc_cm(i), $I_0(\text{Pfc\_cm})$ is a reference value of a current corresponding to the Pfc_cm(i), Vloss is a reference value of a total voltage for calculating a loss, APloss(X_op) is a power loss of an apparatus controlling the control parameter, and $APloss(X_0(\text{Pfc\_cm}))$ is a reference value of the power loss corresponding to the Pfc_cm(i).

9. The fuel cell control command device according to claim 1, wherein the provisional catalyst potential calculation unit calculates the Vcat_op(i,X_op) based on the following Formula (12) or Formula (13):

[Math. 6]

$$V\text{cat\_op}(i, X\_op) = \frac{V\_op(i, X\_op)}{N\text{cell}} + \frac{I\_op(i, X\_op)}{A\text{cell}} \times \frac{R(i) \times A\text{cell}}{N\text{cell}} \quad (12)$$

$$V\text{cat\_op}(i, X\_op) = \frac{V\_op(i, X\_op)}{N\text{cell}} \quad (13)$$

where

Ncell is the number of unit cells of the fuel cell, and
Acell is the area of the unit cell.

10. The fuel cell control command device according to claim 1, wherein the deterioration amount calculation unit calculates the M_op(i,X_op) based on the following Formula (14):

[Math. 7]

$$M\_op(i,X\_op)=\{1-\theta(i)\}\times Fdiss\{Vcat\_op(i,X\_op)\} \quad (14)$$

where Fdiss is a dissolution rate of the cathode catalyst.

11. The fuel cell control command device according to claim 10, wherein the Fdiss is expressed by the following Formula (15):

[Math. 8]

$$Fdiss=k2\times\exp\{\beta 3[Vcat(i)-E2]\} \quad (15)$$

where $k_2$ is a rate constant,
$E_2$ is an equilibrium potential (a constant), and
$\beta_3$ is a constant (a fitting parameter).

12. The fuel cell control command device according to claim 1, wherein the command value calculation unit calculates the Y_op(i,X_op) based on the following Formula (16) or Formula (17):

[Math. 9]

$$Y\_op(i,X\_op) = m1 \times Ploss\_op(i,X\_op) + m2 \times M\_op(i, X\_op) \tag{16}$$

$$Y\_op(i,X\_op) = m1 \times Ploss\_op(i,X\_op) + m2 \times M\_op(i, X\_op) + m3 \times \theta(i) \times \{Vth - Vcat\_op(i,X\_op)\} \tag{17}$$

where $m_1$ is a weighting coefficient for the Ploss_op(i,X_op),
$m_2$ is a weighting coefficient for the M_op(i,X_op),
Vth is a threshold value,
$\theta(i) \times \{Vth - Vcat\_op(i,X\_op)\}$ is an oxide retention term, and
$m_3$ is a weighting coefficient for the oxide retention term, $m_3=0$ holds when Vth−Vcat_op(i,X_op)<0 holds, and $m_3>0$ holds when Vth−Vcat_op(i,X_op)≥0 holds.

13. The fuel cell control command device according to claim 1, wherein the coating state calculation unit calculates the θ(i) based on the Vcat(i), an oxide film formation amount θ(i−1) of the cathode catalyst at a time (i−1), a temperature Tfc(i) of the fuel cell, and a humidity RH(i) of the fuel cell.

* * * * *